United States Patent
Kim

(10) Patent No.: US 6,285,952 B1
(45) Date of Patent: Sep. 4, 2001

(54) NAVIGATION SYSTEM HAVING FUNCTION THAT STOPS VOICE GUIDANCE

(75) Inventor: Jae-Young Kim, Ansan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/468,000

(22) Filed: Dec. 20, 1999

(30) Foreign Application Priority Data

Jul. 31, 1999 (KR) .................................................. 99-31505

(51) Int. Cl.$^7$ .................................................. G01C 21/34
(52) U.S. Cl. .......................... 701/211; 701/208; 340/990; 340/995
(58) Field of Search ..................................... 701/200, 207, 701/208, 209, 210, 211; 73/178 R; 340/988, 990, 995; 345/7, 9

(56) References Cited

U.S. PATENT DOCUMENTS

| | | | |
|---|---|---|---|
| 5,406,492 | * 4/1995 | Suzuki | 701/209 |
| 5,475,599 | * 12/1995 | Yokoyama et al. | 701/211 |
| 5,721,679 | * 2/1998 | Monson | 345/7 |
| 5,784,036 | * 7/1998 | Higuchi et al. | 345/7 |
| 5,850,618 | * 12/1998 | Suetsugu et al. | 701/211 |
| 5,890,089 | * 3/1999 | Ogino et al. | 701/211 |
| 5,903,228 | * 5/1999 | Ohgaki et al. | 701/209 |
| 5,938,718 | * 8/1999 | Morimoto et al. | 701/209 |
| 6,125,326 | * 9/2000 | Ohmura et al. | 701/211 |

* cited by examiner

Primary Examiner—Gary Chin
(74) Attorney, Agent, or Firm—Christie, Parker & Hale, LLP

(57) ABSTRACT

Disclosed is a navigation system providing information on a position of a car. The system has a switch that is manipulated by a user to provide information on whether to operate a voice guidance function and/or a projector function. A controller controls the navigation system to provide voice guidance and/or projection functions according to a selection of the switch so as to provide directions to a branch road. The system also includes a voice guide for providing an audible guide message according to control signals of the controller, and a projector that projects a directional display on a windshield according to the control signals of the controller.

10 Claims, 2 Drawing Sheets

NAVIGATION SYSTEM HAVING FUNCTION THAT STOPS VOICE GUIDANCE

BACKGROUND OF THE INVENTION

(a) Field of the Invention

The present invention relates to a navigation system. More specifically, the present invention relates to a navigation system that is installed in an automobile and provides information on a current location of the automobile, as well as other supplementary information.

(b) Description of the Related Art

A navigation system receives waves from a plurality of wave sources, that is, satellites, and obtains a measure of the distance from the wave sources using time differences between the arrival of the waves, differences of phase, and Doppler shift so that the current position of the navigation system is found. If a driver inputs a destination to the navigation system before the automobile starts moving, the current position is displayed on a navigation system map, and the system indicates when to change direction in order to reach the destination.

Some recent navigation systems are also equipped with a voice guidance function. This function guides the driver to proceed down branch roads, and announces this guidance several times until the car reaches the appropriate branch road. Examples of this guidance are "Please turn to your right after driving one kilometer." or "Please turn to your right after driving 700 meters."

When the above noted announcements are played, the output from the automobile sound system is muted, and when the announcements are finished, the output is resumed. Because of the potential inconvenience of this audio cutout, the driver should have the opportunity to disable this function.

SUMMARY OF THE INVENTION

It is an object of the present invention to provide a system wherein the driver can select voice guidance when needed, and wherein directional indicators can be visually displayed to the driver.

In one aspect of the present invention, a navigation system providing information on a position of an automobile comprises a switch receiving information from a user about whether to operate a voice guidance function; a controller controlling the navigation system to provide a voice guidance function according to a selection of the switch so as to direct the driver to a branch road; and a voice guide announcing an audible guide message according to control signals from the controller.

The system further comprises a projector that projects a directional display on a windshield according to the control signals of the controller.

Operation of the switch allows the user to select either the voice guidance or the projection function, or both. When the switch is pushed once the voice guidance function is enabled, and when the switch is pushed again only the projection function is enabled. When the switch is pushed a third time, the voice guidance and projection functions are concurrently enabled, and when the switch is pushed once more the system is disabled.

The projector lamp blinks as the automobile approaches an impending turn. As the guidance system steps progress, that is, as the automobile gets closer to the branch road, the blinking becomes quicker, and in the final step the directional indicator stays lit. When the car passes the branch road the lamp is turned off.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
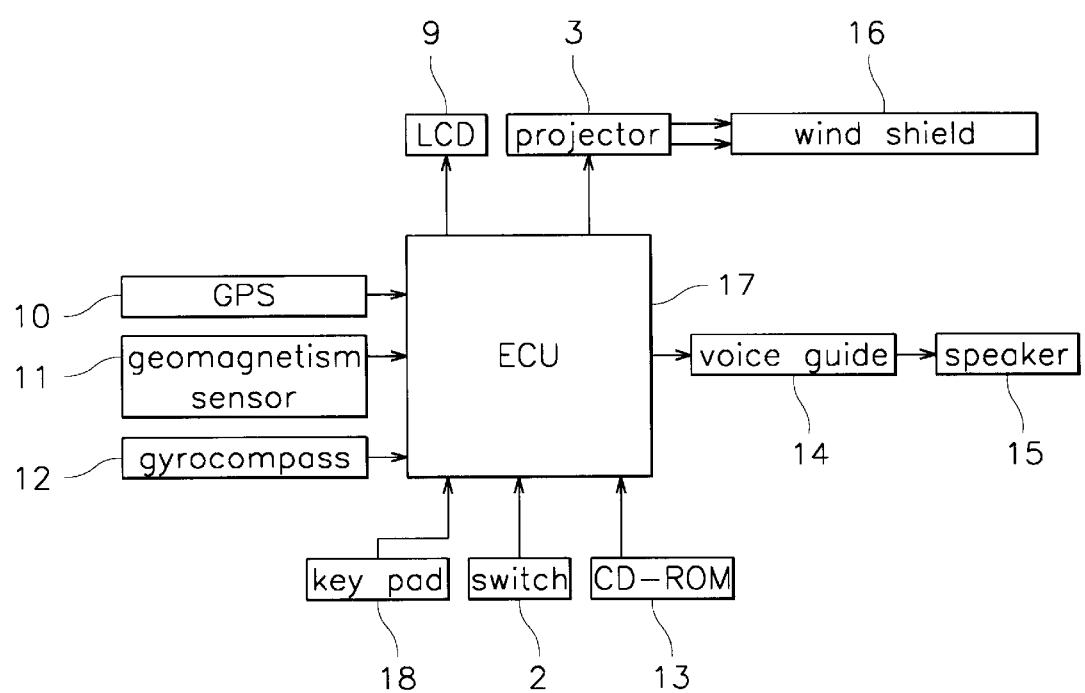
FIG. 1 is a block diagram of a navigation system according to a preferred embodiment of the present invention.

FIG. 1 shows a block diagram of a navigation system according to a preferred embodiment of the present invention.

As shown, the navigation system comprises a switch 2 that receives information from the driver about whether to operate voice guidance and/or projection functions; a global positioning system (GPS) 10 that receives signals from a plurality of GPS satellites and computes current position; a compact disc read only memory (CD-ROM) 13 that stores map information; a geomagnetism sensor 11 that detects direction of travel of a car; and a gyrocompass 12 that detects orientation of the car; an electronic control unit (ECU) 17 that receives input from the driver through a keypad 18 regarding a desired destination, as well as data from the GPS 10, CD-ROM 13, geomagnetism sensor 11, and gyrocompass 12, and provides voice guidance and projection display for branch roads and directions depending on the output of the switch 2; a liquid crystal display (LCD) 9 that displays a current position of the automobile and its related map according to a control signal from the ECU 17; a voice guide 14 that outputs voice guide messages according to the control signal of the ECU 17; a speaker 15 that outputs an audio signal of the voice guide 14; and a projector 3 that projects a directional indicator onto the windshield 16, from the light of a installed lamp 1, in a direction corresponding to the control signal of the ECU 17.

Figure 2:
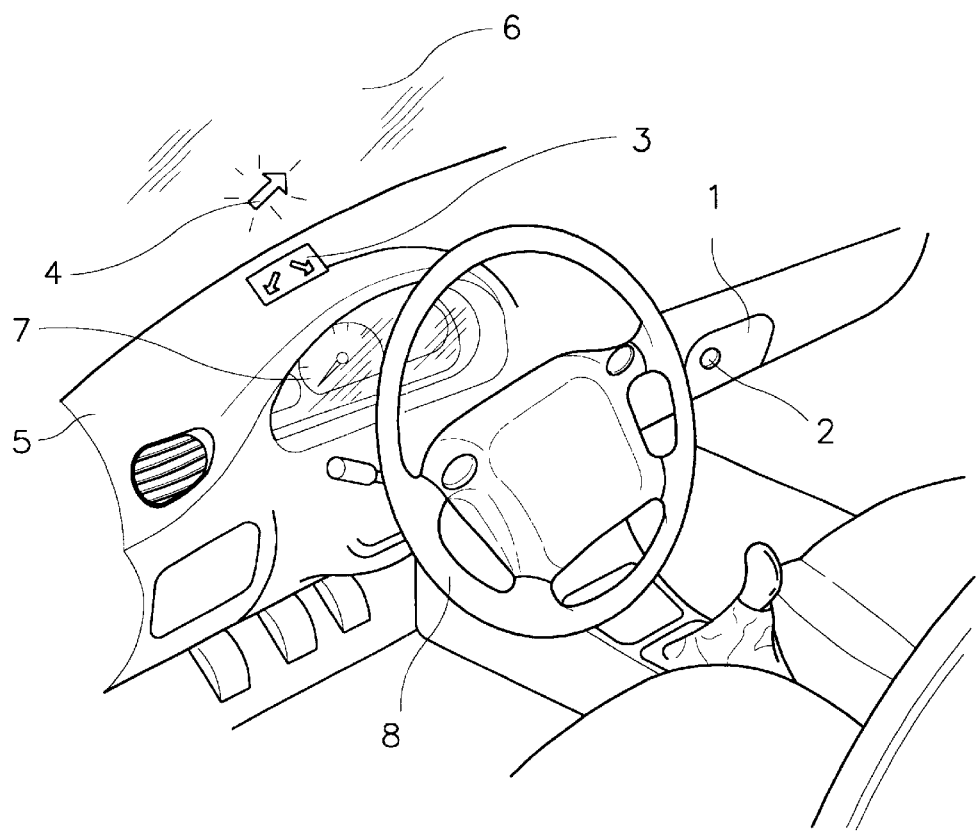
FIG. 2 is an appearance of an automobile in which a navigation system is installed.

FIG. 2 is an appearance of an automobile in which a navigation system is installed.

As shown, the switch 2 is installed on the outside of the navigation system 1 for easy driver manipulation. The projector 3 is installed on the upper side of a crash pad 5 so that a directional indicator 4 may be well displayed on the windshield 6.

First, when power is supplied by the driver, the navigation system according to a preferred embodiment of the present invention is started.

After the navigation system is started, the driver inputs information on the destination via the keypad 18. At this time, the switch 2 is operated in order to select the desired functions). When the switch 2 is pushed once the voice guidance function is enabled, when the switch 2 is pushed again only the projection functioned is enabled, when the switch 2 is pushed a third time both the voice guidance and projection functions are enabled, and when the switch is pushed again the system is turned off by turning off the output signals of the ECU 17.

The GPS 10 then measures the arrival time of the waves from the 3 or 4 satellites to compute the location of the GPS 10, and outputs the current position to the ECU 17. The geomagnetism sensor 11 detects the direction of travel of the automobile, the gyrocompass 12 detects the orientation of the car, and both sensors output the results to the ECU 17.

The ECU 17 notes the position of the car with respect to the map installed on the CD-ROM according to the outputs of the switch 2, GPS 10, geomagnetism sensor 11, and gyrocompass 12, and provides the voice guidance and/or projection functions.

The LCD 9 displays the current position of the automobile and its related map according to the control signals of the ECU 17, and indicates a path to the destination that was previously input by the driver using the keypad 18. At the same time, the driver drives the vehicle while listening to the automobile sound system.

When a branch road where the vehicle must turn becomes near, the ECU 17 operates the voice guide 14 and/or projector 3 according to the status of the switch 2 selected by the user.

That is, when the switch 2 has been pushed once, the ECU 17 makes the system perform the voice guidance function via the voice guide 14 and speaker 15. When the switch 2 has been pushed twice, the projector 3 is made to only display the direction indicator 4 on the windshield. When the switch 2 has been pushed three times, the voice guidance and projection functions are concurrently enabled, and when the switch 2 has been pushed a fourth time, the system is turned off.

The projector lamp blinks when the branch road is first in range, the blinking becomes faster as the automobile gets nearer to the branch road, and the directional indicator remains lit when the automobile is very near the branch road. When the automobile has passed the branch road, the lamp is turned off for easy discrimination by the driver.

Therefore, while the user is listening to the automobile sound system and does not want to miss any audio output, the user may manipulate the switch 2 in order to turn off the voice guidance function, but still maintain the projection function.

Separate switches can be added for the projection and guidance functions, and the projector 3 can be placed in another position if the need should arise.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A navigation system for an automobile providing information on a position of the automobile, comprising:
   a switch that is manipulated by a user to transmit information to select the performance of at least one function selected from the group of voice guidance and projection functions, wherein the switch operates such that when the switch is pushed once the voice guidance function is performed, when the switch is pushed again the projection function is performed, when the switch is pushed one or more time the voice guidance and projection functions are concurrently performed, and when the switch is pushed a fourth time the system is turned off;
   a controller for providing control signals, the controller controlling the navigation system to provide a voice guidance function according to a selection of the switch for providing directions to a branch road;
   a voice guide providing an audible guide message according to control signals of the controller; and
   a projector that projects a directional display on a windshield according to the control signals.

2. A navigation system for an automobile providing information on a position of the automobile, comprising:
   a switch that is manipulated by a user to transmit information to select the performance of at least one function selected from the group of voice guidance and projection functions;
   a controller for providing control signals, the controller controlling the navigation system to provide a voice guidance function according to a selection of the switch for providing directions to a branch road;
   a voice guide providing an audible guide message according to the control signals of the controller; and
   a projector that projects a directional display on a windshield when performing the projection function, wherein the directional display blinks at an increasing rate as the automobile gers nearer to the branch road, the directional display remaining lit when the automobile is very near the branch road, and when the automobile has passed the branch road the directional display is turned off for easy discrimination by a user.

3. A navigation system for a vehicle providing directions to a desired road, comprising:
   a speaker for generating audible directions for turning on roads for getting to the desired road;
   a projector having a light source for generating an illuminated display on a windshield of the vehicle, said light source being activated when the vehicle is approaching a road that the vehicle should turn on for getting to the desired road;
   a controller coupled to the speaker and to the projector, wherein the controller generates a signal for activating the speaker and a signal for activating the projector; and
   a switch coupled to the controller for selecting at least one of said speaker and projector to be activated.

4. A navigation system as recited in claim 3 wherein the display comprises a pair of indicators wherein when the vehicle should be turned right, one of said indicators is illuminated, and wherein when the vehicle should be turned left the other of said indicators is illuminated.

5. A navigation system as recited in claim 4 wherein the appropriate indicator blinks as the vehicle approaches the road on which it should turn.

6. A navigation system as recited in claim 5 wherein the appropriate indicator blinks at an increasing rate as the vehicle gets closer to the road on which it should turn.

7. A navigation system as recited in claim 5 wherein the appropriate indicator is illuminated when the vehicle is proximate the road on which it should turn.

8. A navigation system as recited in claim 7 wherein the appropriate indicator is turned off when the vehicle passes the road it should turn on.

9. A navigation system as recited in claim 3 wherein the light souce blinks as the vehicle approaching the road on which it should turn.

10. A navigation system as recited in claim 9 wherein the light source blinks at an increasing rate as the vehicle gets closer to the road it should turn on.

\* \* \* \* \*

UNITED STATES PATENT AND TRADEMARK OFFICE
CERTIFICATE OF CORRECTION

PATENT NO. : 6,285,952 B1
DATED : September 4, 2001
INVENTOR(S) : Jae-Young Kim

It is certified that error appears in the above-identified patent and that said Letters Patent is hereby corrected as shown below:

Column 3,
Line 62, after "one" delete "or".

Column 4,
Line 22, replace "gers" with -- gets --.
Line 55, replace "is" with -- remains --.
Line 61, replace "approaching" with -- approaches --.

Signed and Sealed this

Eighteenth Day of February, 2003

JAMES E. ROGAN
*Director of the United States Patent and Trademark Office*